United States Patent [19]

Chihara et al.

[11] Patent Number: 4,745,018

[45] Date of Patent: May 17, 1988

[54] TREATMENT OF FRP SURFACES FOR BONDING

[75] Inventors: Kohji Y. Chihara, Hudson; Earl G. Melby, Uniontown, both of Ohio

[73] Assignee: GenCorp Inc., Akron, Ohio

[21] Appl. No.: 93,674

[22] Filed: Sep. 8, 1987

[51] Int. Cl.⁴ .......................... B32B 3/00; B29C 37/00; B44C 1/22
[52] U.S. Cl. .................................. 428/141; 156/272.8; 156/629; 156/643; 156/668; 219/121 LJ; 219/121 LM; 428/156; 428/171
[58] Field of Search ................ 156/272.8, 307.3, 330, 156/331.7, 629, 633, 643, 654, 668; 428/141, 156, 171, 172, 236, 430; 219/121 LH, 121 LJ, 121 LM

[56] References Cited

U.S. PATENT DOCUMENTS 4,414,059  11/1983  Blum et al. .................... 156/668 X
4,417,948  11/1983  Mayne-Banton et al. .......... 156/643
4,642,163   2/1987  Greschner et al. ............. 156/668 X Primary Examiner—William A. Powell

[57] ABSTRACT

Irradiation of FRP surfaces by means of pulsed eximer lasers of from about 180 to 260 nm to etch or to photo ablative decompose the surface of the FRP parts without causing changes in the matrix of the FRP parts increases the adhesive potential of FRPs to structural adhesives. Thus, the bond between FRP parts is strengthened.

12 Claims, No Drawings

TREATMENT OF FRP SURFACES FOR BONDING

This invention relates to bonding together FRP parts which can be used in the manufacture of automobile, truck and other vehicles and products.

BACKGROUND OF THE INVENTION

Parts manufactured from fiber reinforced polyester (FRP) parts are frequently bonded to other FRP parts or metal parts through the use of polyurethane adhesives. It has been common practice to treat the surfaces to be bonded by sanding and/or by wiping with a primer solution. Typically this primer solution consists of a diisocyanate in methylene chloride (2%). It has been shown by surface spectroscopy that methylene chloride removes a layer of low molecular weight materials, mostly hydrocarbons, from the FRP surface. The diisocyanate can then react with the FRP surface and the polyurethane adhesive.

Without the use of such a treatment, long term adhesion strength is reduced and at times even initial adhesion strength is not adequate. However, methylene chloride and free isocyanates are not desirable materials to use in manufacturing. On the other hand sanding is labor-intensive and can cause environmental (dust) problems.

Eximer lasers, like other lasers, produce a beam of single-color light by using an electric current or flash lamp to pump energy into atoms or excite them. In a fraction of a second, the energy-sated atoms relax, ridding themselves of the excess energy by emitting a light wave. Most lasers use atoms or ions of one element, but the eximer laser works by exciting molecules of two atoms of different elements, such as argon and fluorine. Such molecules are called diatomic or dimers; the term eximer is a contraction of excited dimer. An excimer is a compound that has no stable ground state but that may have excited states when temporarily bound to other molecules.

See "Encyclopedia of Chemical Technology," Kirk-Othmer, Third Edition, Volume 14, John Wiley & Sons, New York, 1981, page 61.

In the semiconductor area, eximer based processes for lithography, film deposition, etching, doping and annealing have been developed. In materials processing, laser based cutting, drilling, marking techniques and photo ablative decomposition or etching have been developed. Znotins, "Industrial Applications of Eximer Lasers," from PAPER PRESENTED AT SPIE CONFERENCE 668 (56) LASER PROCESSING: FUNDAMENTALS, APPLICATIONS AND SYSTEMS ENGINEERING, QUEBEC CITY, CANADA, June 3-6, 1986.

Far-ultraviolet radiation (e.g. 185 nm from a mercury resonance lamp or 193 nm from a pulsed eximer laser) is highly effective in modifying the surfaces of a variety of polymers because of its short penetration depth ($<3000$Å) and its high ($>0.1$) quantum yield for bond breaking. With continuous low-level irradiation at 185 nm in the presence of specific gases functional groups can be introduced on the surface while etching is kept at a low rate. In contrast, the pulsed laser radiation at 193 nm causes ablative photodecomposition leading to a surface showing negligible reaction with the surrounding atmosphere. This process can be conveniently used in controlled etching of polymers such as poly(methyl methacrylate), poly(ethyleneterephthalate), polyimide and polycarbonate. nm = nanometer. Srinivasan et al, "Polymer," 1985, Vol. 26, August (Conference Issue), pages 1297–1300.

Pulsed excimer laser using argon and fluorine (193 nm) or krypton and fluorine (248 nm) with helium gas as a buffer for the two wavelengths was used in the photochemical cleavage or ablation (etching) of polymethylmethacrylate. The products of the laser ablation of poly(methyl methacrylate) ($\overline{M}_n \sim 800\,000$) at 193 or 248 nm ranges from $C_2$ through methyl methacrylate and a solid that was a low molecular weight ($\overline{M}_n = 2500$) fraction of PMMA. While the products were the same at both wavelengths, the mix was quite different. It was stated that ablative photodecomposition is a novel method to cleave an organic solid. In contrast to alternative methods such as mechanical pressure or thermal decomposition, both of which occur in the ground electronic state of the bonds undergoing rupture, ablative photodecomposition involves the electronically excited state of the bond that is broken. Srinivasan et al, "Macromolecules," 1986, 19, 916–921.

A XeCl pulsed eximer laser at 308 nm and a KrF pulsed eximer laser at 248 nm used for photolithography gave excellent quality images without producing a random pattern. It is stated that the images are comparable to those obtained with lamps and are about two times faster. Jain et al, "IEEE Electron Device Letters," Vol. EDL-3, No. 3, March, 1982.

European Pat. Application No. 0108189 A2 (1984) discloses the photoetching of polyimides using a pulsed ArF laser or a Hg lamp having wavelengths less than 220 nm. It is stated that the presence of an atmosphere containing oxygen enhances the etch rate. It is stated that the polyimide is photochemically etched without heating of the substrate and without degradation of the bulk of the material.

U.S. Pat. No. 4,414,059 discloses the far UV patterning of resist materials. It states that the present process does not depend on the nature of the organic resist, on the presence of oxygen or on the temperature. It discloses the use of a pulsed ArF eximer laser to provide UV irradiation at wavelengths less than 220 nm at a power density necessary to cause ablative photodecomposition. It discloses polymethylmethacrylate (PMMA).

An object of this invention is to provide a method for improving the bonding of FRP parts to each other.

Another object is to provide a novel FRP laminate.

These and other objects and advantages of the present invention will become more apparent to those skilled in the art from the following description and working examples.

SUMMARY OF THE INVENTION

It has been found that treatment of FRP surfaces with pulsed eximer laser irradiation of from about 180 to 260 nm will clean or etch the surface of the FRP with microridges and depressions including pores. The new surface enables the obtainment of improved results when using a structural adhesive, e.g., epoxides or polyurethanes, to bond together two laser treated FRP parts. Examples of suitable eximer lasers to use are ArF (193 nm), KrCl (222 nm), KrF (249 nm) and XeCl (308 nm) and XeF (350 nm). In some instances a urethane solution primer wipe applied to the treated surface prior to applying the adhesive coating gave increased bonding strength.

Advantages of eximer laser usage for FRPs are the following: (a) dry process; (b) quick process: (c) non-hazardous: (d) no restrictions from atmospheric conditions; (e) clean process; (f) precisely controllable etching; (g) can be adapted to robotic arm-computerized system and (h) reasonable capital cost and maintenance.

DISCUSSION OF DETAILS AND PREFERRED EMBODIMENTS

The glass fiber reinforced thermoset plastic (FRP) such as the polyester resin or vinyl ester resin, styrene and glass fiber composition can be a sheet molding compound (SMC) or a bulk molding compound (BMC), or other thermosetting FRP material as well as a high strength molding compound (HMC) or a thick molding compound. The FRP substrate can have from about 10 to 75% by weight of glass fibers. The SMC compound usually contains from about 25 to 30% by weight of glass fibers while the HMC compound may contain from about 55 to 60% by weight of glass fibers. The glass fiber reinforced thermoset plastic (FRP) substrate can be rigid or semirigid (may contain a flexibilizing moiety such as an adipate group in the polyester) and a low profile additive. The substrate, also, may contain other flexibilizing polymers, the elastomers and plastomers, such as the styrene-butadiene block copolymers. Unsaturated polyester glass fiber thermosets are known as shown by "Modern Plastics Encyclopedia," 1975-1976, Oct., 1975, Vol. 52, No. 10A, McGraw-Hill, Inc., New York, pages 61, 62, and 105 to 107; "Modern Plastics Encyclopedia," 1979-1980, Oct., 1979, Volume 56, Number 10A, pages 55, 56,58, 147 and 148 and "Modern Plastics Encyclopedia," 1980-81, Oct., 1980, Volume 57, Number 10A, pages 59, 60, and 151 to 153, McGraw-Hill, Inc., New York, N.Y. For more information on unsaturated polyester resins, vinyl ester resins and monomers for crosslinking these resins see U.S. Pat. No. 4,331,735.

The epoxy resin adhesive used can be the diglycidyl ether of bisphenol A (and its homologs), glycidyl ethers of glycerol, glycidyl ethers of bisphenol F, glycidyl ethers of long-chain bisphenols, epoxylated novalacs, the diglycidyl ester of linoleic dimer acid and so forth. They are cured with aliphatic amines, aromatic amines, anhydrides and polyamides. The epoxies are well known. For more information on epoxy resins please see Lee and Neville, "Epoxy Resins," McGraw-Hill Book Company, Inc., New York, 1957; Lee and Neville, "Handbook of Epoxy Resins," McGraw-Hill Book company, New York, 1967; Bruins, "Epoxy Resin Technology," Interscience Publishers, a division of John Wiley & Sons, New York, 1968 and "Encyclopedia Of Polymer Science And Technology," John Wiley & Sons, Inc., New York, Vol. 1, 1964.

Polyurethane (urethane, isocyanate) adhesives used in this invention are well known, They are prepared from diisocyanates or triisocyanates, diisocyanate or triisocyanate terminated polyethers or polyesters (polyether urethanes or polyester urethanes).

Examples of isocyanates which can be used are 2,4/2,6-tolylene diisocyanate, triphenyl methane-p,p',p"-triisocyanate, the adduct of 2,4-toluene diisocyanate (3 moles) and 3-methylol pentylene glycol-2,4 (1 mole), diphenylmethane-p,p'-diisocyanate, dianisidine diisocyanate and polymethylene polyphenyl isocyanate and the like. Hydroxyl bearing polyethers and polyesters, e.g., polyols, are used for reaction with the isocyanates.

Examples of polyether polyols which can be used include linear and branched polyethers having a plurality of ether linkages and containing at least two hydroxyl groups and being substantially free from functional groups other than hydroxyl groups. Among the polyoxyalkylene polyols which are useful in the practice of this invention are the polypropylene glycols, the polypropylene-ethylene glycols, and the polybutylene ether glycols. Other copolymers are the ethylene oxide, propylene oxide and butylene oxide adducts of 2-ethyl-hexanediol-1,3, glycerol, 1,2,6-hexanetriol, trimethylolpropane, trimethylolethane, pentaerythritol, triethanolamine, triisopropanolamine, ethylenediamine and ethanolamine.

Polyester polyols which can be used are obtained by reacting (1) a major molar amount of a glycol such as ethylene-, propylene-, diethylene-, dipropylene- or butylene glycol; and (2) an acid or anhydride such as adipic acid, azelaic acid, terephthalic acid or phthalic anhydride and so forth. Examples of some polyesters are poly(ethylene succinate), poly(ethylene adipate), poly(diethylene adipate), poly(ethylene azelate) and poly(ethylene sebacate).

Cross-linking materials having from 2 to 8 hydroxyl groups can be included in the urethane formulation to increase cross-link density and so forth. Examples of such cross-linking agents are ethylene glycol, diethylene glycol, propylene glycol, butane diol-1,4, dipropylene glycol, glycerol, trimethylolpropane, butane triols, hexanetriols, trimethylolphenol, various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivatives of polyfunctional compounds having three or more reactive hydrogen atoms, such as, for example the reaction product of trimethylolpropane, glycerol, 1,2,6-hexanetriol, sorbitol and other polyols with ethylene oxide, propylene oxide, or other alkylene oxides or mixtures thereof. The urethane adhesive formulation uses gelation catalysts like stannous octoate, dibutyl tin dilaurate and the like for the urethane forming reaction.

For information on isocyanate based adhesives see Skeist, "Handbook Of Adhesives," Reinhold Publishing corporation, New York, 1962. See, also, Saunders et al, "Polyurethanes Chemistry and Technology," Part I, Chemistry, Interscience Publishers, a division of John Wiley & Sons, New York, 1962.

Fillers can be added to the adhesives.

The processes and products of the present invention can be used in the manufacture of automobile parts such as grille and headlamp assemblies, deck hoods, fenders, door panels and roofs as well as in the manufacture of appliance and electrical components, furniture, machine covers and guards, bathroom components, structural panels and so forth. In particular, the process of the present invention is useful in joining a structural FRP to another structural FRP to reinforce it or to provide a mounting member for a part, for example, the non-visible parts of a car. The following examples will serve to illustrate the present invention with more particularity to those skilled in the art.

EXAMPLE 1

(a) A flat sheet (0.1" thick) of a polyester styrene based glass fiber reinforced FRP having polyvinyl acetate as the low profile additive and calcium carbonate powder as a filler was irradiated with an argon fluoride eximer laser (193 nm) at 150 mJ per pulse, 0.17×3.4 cm beam spot size and 0.028 cm step scan. The average irradiation was 6 pulses at 257 mJ/cm$^2$. The gloss of the FRP surface was eliminated by the laser irradiation. A scanning electron micrograph (1,500×) of the laser-treated FRP surface showed clean microridges and depressions, composed of calcium carbonate particles partially embedded into the resin layer which had exposed micropores. On the other hand on untreated FRP surfaces, calcium carbonate particles were seen by the scanning electron microscope as if they were sunk under a transparent resin layer.

(b) The laser treatment increased the CaCO$_3$ band intensity at 870 cm$^{-1}$ (FT-IR-ATR) on the FRP surface by 7 times relative to the band intensities of polyvinyl acetate at 1250 cm$^{-1}$ and polyester at 1155 cm$^{-1}$, while the polyvinyl acetate/polyester band intensity ratio was relatively unchanged. The penetration depth of IR light was estimated to be ~1$\mu$ at 1000 cm$^{-1}$. No change occurred in the FRP matrix (FT-IR-ATR).

(c) The water droplet contact angles decreased on the laser treated FRP surface from 80. to ~65° in seconds and spread quickly, showing the absorbability of the treated surface. On the other hand, the water droplet contact angles were ~90° and did not change in minutes on the untreated FRP surface.

(d) Standard lap-shear adhesive strength test specimens were prepared by using the argon fluoride laser-treated FRP sheets and a two component polyurethane adhesive with and without a primer (wipe) of 2% diphenylmethane diisocyanate in methylene chloride. The two components of the polyurethane adhesive were mixed and applied to the FRP sheets (1×4×0.1 inches) by using adhesive meter-mixing equipment (Kappa, made by Nakai Seiki K.K.).

(e) The adhesive was sandwiched between the FRP surfaces untreated and treated with the laser (the adhered area: 1×1 inches). The sandwiched specimens were placed in aluminum fixtures and heated at 250° F. (121° C.) for 1 hour in an oven. The bonded specimens were removed from the fixture, post-heated at 300° F. (149° C.) for 1 hour in an oven and cooled to room temperature to give the final lap-shear adhesive test specimens. The specimens were tested at 80° C. using an Instron. The lap-shear adhesive strength is shown in Table 1, below, where the numbers are average values from 4 test results and the observed fluctuation was +44 psi:

TABLE 1

| | Adhesive Strength |
|---|---|
| Laser treatment without primer | 415 psi |
| Laser treatment with primer | 474 psi |
| No laser treatment without primer | 351 psi |
| No laser treatment with primer | 341 psi |

EXAMPLE 2

(a) A flat sheet (0.1" thick) of a polyester styrene based glass fiber reinforced FRP having a polyesterurethane as the low profile additive and calcium carbonate powder as a filler was irradiated with a krypton fluoride eximer laser (249 nm) at 315 mJ per pulse (260 mJ per pulse through cylindrical lens), 0.3 cm×3.3 cm beam spot size, and 0.1 cm step scan. The average irradiation was 3 pulses at 263 mJ/cm$^2$. The gloss of the FRP surface was eliminated by the laser. Scanning electron micrographs (1,000× and 6,000×) of the laser-treated FRP surface showed micropores (0.1 to 1.5 $\mu$m), but not exposed calcium carbonate particles. The laser treatment increased the CaCO$_3$ band intensity at 870 cm$^{-1}$ (FT-IR-ATR) on the FRP surface by twice relative to the band intensity of 1155 cm$^{-1}$ polyester. Water droplet contact angles decreased from $\gtrsim$100° to ~70° in minutes on the laser treated FRP surface (~70° and no change on the untreated surface). No pores were found on untreated FRP sheets. No change occurred in the FRP matrix (FT-IR-ATR).

(b) Standard lap-shear adhesive strength test specimens were prepared by using the krypton fluoride laser-treated FRP sheets and with another two component polyurethane adhesive with and without primer of 2% diphenylmethane diisocyanate in methylene chloride The test specimens were prepared in a similar way as in Example 1 (d), except that curing conditions were 30 minutes at 100° C. on an aluminum plate and a post-cure of 60 minutes at 150° C. in an oven. The specimens were tested at 80° C. before or after immersion in weater at 54.4° C. for 7 days.

The lap-shear adhesive strength is shown in Table 2, below, where the numbers are average values of 5 test results, the standard deviations of the observed 5 numbers are in parenthesis, and + and − signs show the corresponding treatment done, and not done, respectively

TABLE 2

| Run no. | 1 | 2 | 3 | 4 | 5 | 6 | 7 | 8 | 9 | 10 |
|---|---|---|---|---|---|---|---|---|---|---|
| Laser treatment | − | − | − | − | + | + | + | + | − | − |
| Priming | − | − | + | + | − | − | + | + | − | − |
| Sanding | − | − | − | − | − | − | − | − | + | + |
| Water immersion | − | + | − | + | − | + | − | + | − | + |
| Lap-shear adhesive strength (psi) | 104 | 59 | 216 | 123 | 343 | 220 | 219 | 134 | 234 | 142 |
|  | (±35) | (±31) | (±11) | (±12) | (±19) | (±14) | (±87) | (±29) | (±62) | (±61) |
| Increase (psi) | — | — | +112 | +64 | +239 | +161 | +105 | +75 | +130 | +83 |

Table 2 shows the following: (a) the krypton fluoride excimer laser treatment increased the adhesive strength the most both before and after the water immersion; (b) the sanding increased the adhesive strength a little more than the priming; (c) the krypton fluoride treatment with priming was nearly the same as the priming treatment only possibly indicating that the isocyanate wipe after etching with the KrF excimer lasermay have adversely affected the surface of the FRP in this case.

FT-IR-ATR = Fourier Transform-Infrared-Attenuated Total Reflectance.

The FRP parts used in the Examples were typically made a follows:

An SMC was first made as follows:

| Ingredients | % By Weight |
|---|---|
| Unsaturated polyester | 7.4 |

| Ingredients | % By Weight |
| --- | --- |
| Styrene | 10.8 |
| Low shrink additive | 3.8 |
| Filler (calcium carbonate) | 48 |
| Glass Fibers | 28 |
| Peroxides, inhibitors, release agents, maturation agents, pigments | 2 |

The SMC composition was placed in a compression mold in a 240-ton press and cured at about 150° C. for 90 seconds at a pressure of about 1150 psi to make an FRP part.

The two-component polyurethane adhesive typically comprised (I) a diisocyanate terminated polyalkylene ether polyol containing fillers and (II) a multifunctional polyalkylene ether polyol, urethane catalyst and filler.

We claim:

1. The method which comprises irradiating the surface of FRP parts with a pulsed eximer laser operating at from about 180 to 260 nm to etch or to photo ablative decompose the surfaces of the FRP parts without causing change in the FRP matrix, coating the treated surface of at least one part with an adhesive selected from the group consisting of epoxy based adhesives and polyurethane based adhesives, joining the adhesive coated and treated part and a treated part together so that the adhesive is sandwiched between the treated surfaces of the parts and curing and heat treating the same for from about 90 to 120 minutes at a temperature of from about 100 to 150° C. to form a strong adhesive bond between the parts.

2. The method according to claim 1 where the adhesive is an epoxide based adhesive.

3. The method according to claim 1 where the adhesive is a polyurethane based adhesive.

4. The method according to claim 1 where said eximer laser is selected from the group consisting of ArF (193 nm), KrCl (222 nm) and KrF (249 nm), XeCL (308 nm) and XeF (350 nm) eximer lasers.

5. The method according to claim 4 where the adhesive is an epoxide based adhesive.

6. The method according to claim 4 where the adhesive is a polyurethane based adhesive.

7. The product produced by the method of claim 1.
8. The product produced by the method of claim 2.
9. The product produced by the method of claim 3.
10. The product produced by the method of claim 4.
11. The product produced by the method of claim 5.
12. The product produced by the method of claim 6.

* * * * *